Figure 1:
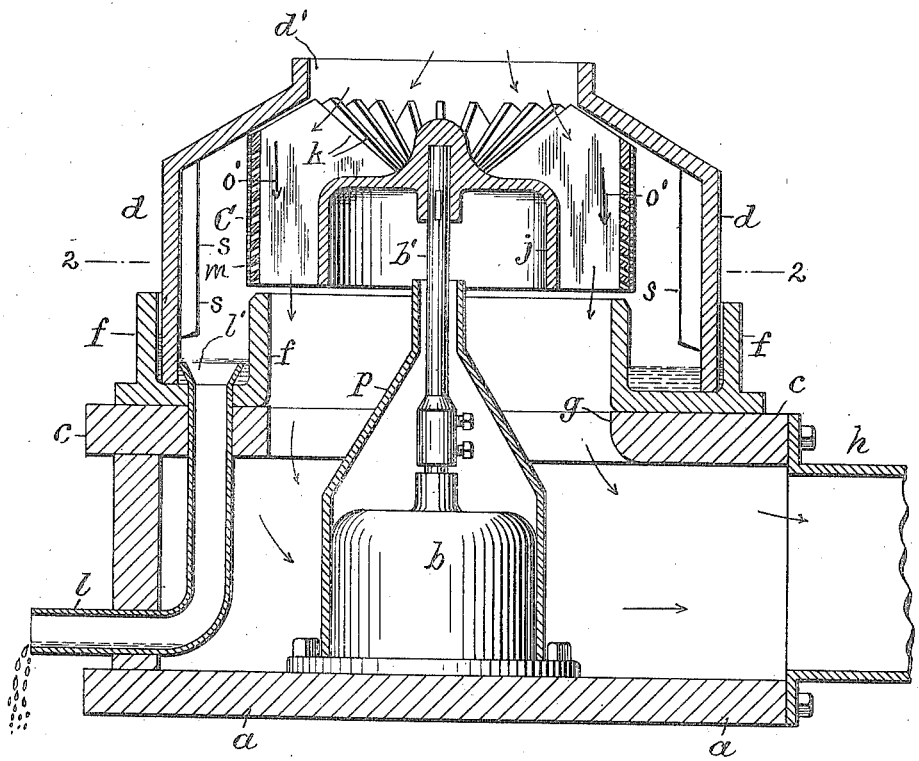

W. J. BALDWIN.
PROCESS AND APPARATUS FOR SEPARATING MOISTURE FROM GAS.
APPLICATION FILED MAR. 23, 1921.

1,393,335.

Patented Oct. 11, 1921.

2 SHEETS—SHEET 1.

Inventor.
William J. Baldwin,
per Thos. S. Crane, atty.

W. J. BALDWIN.
PROCESS AND APPARATUS FOR SEPARATING MOISTURE FROM GAS.
APPLICATION FILED MAR. 23, 1921.
1,393,335.
Patented Oct. 11, 1921.
2 SHEETS—SHEET 2.
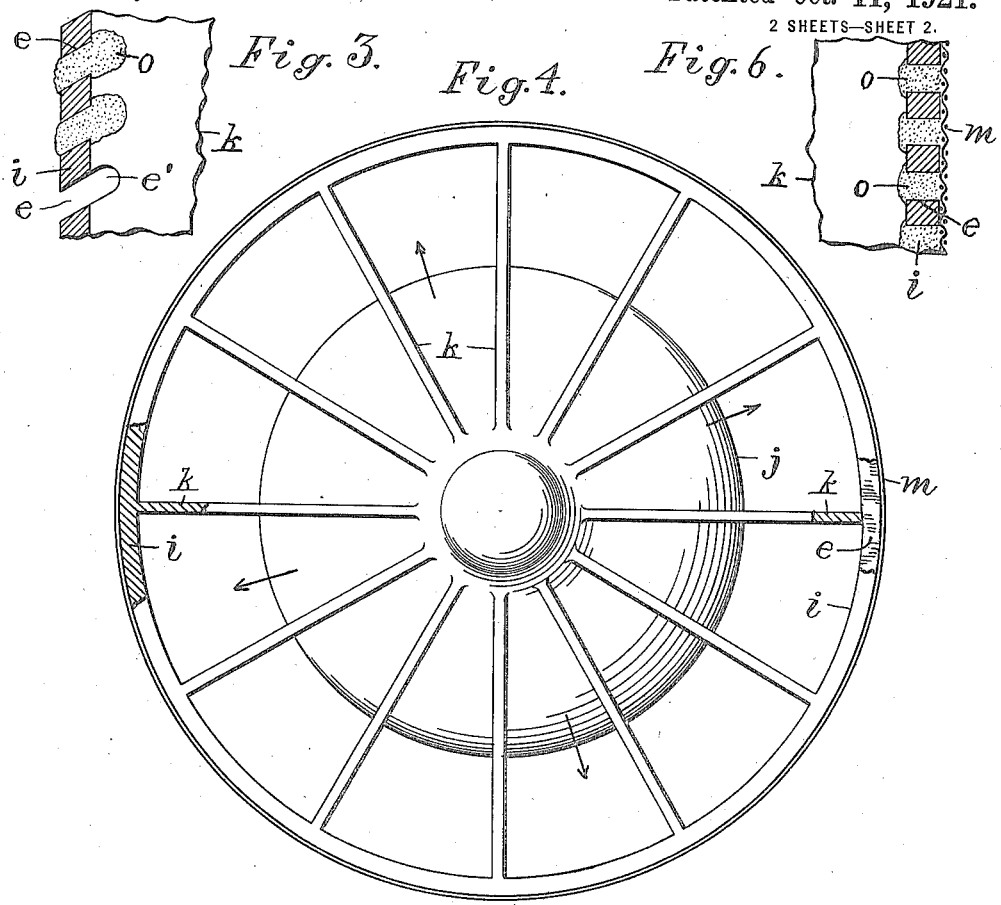
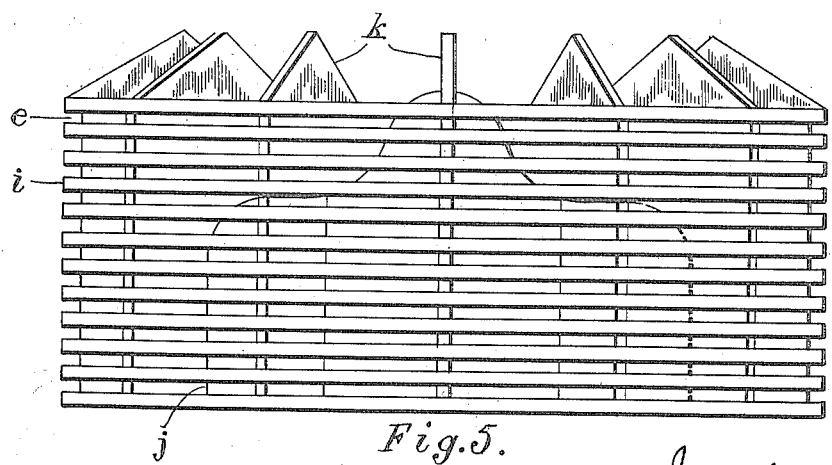

UNITED STATES PATENT OFFICE.

WILLIAM J. BALDWIN, OF BROOKLYN, NEW YORK.

PROCESS AND APPARATUS FOR SEPARATING MOISTURE FROM GAS.

1,393,335.  Specification of Letters Patent.  Patented Oct. 11, 1921.

Application filed March 23, 1921. Serial No. 454,683.

*To all whom it may concern:*

Be it known that I, WILLIAM J. BALDWIN, a citizen of the United States, residing at 151 Halsey street, Brooklyn, county of Kings, and State of New York, have invented certain new and useful Improvements in Processes and Apparatus for Separating Moisture From Gas, fully described and represented in the following specification and the accompanying drawings, forming a part of the same.

This invention relates to improvements in the art of separating moisture from the atmosphere or other gases, and to facilitate the description following the term "gas" will be used herein to include the atmosphere and all other gases and vapors.

The invention consists in a particular application of hygrometric material to the process of separating moisture from gas in a continuous operation, and it consists in sustaining the hygrometric material upon a suitable carrier, propelling the gas against the said material and separating the moisture therefrom and collecting it apart from the purified gas. The invention includes both a process and an apparatus which latter is susceptible of many modifications; and it will be understood that the form of the apparatus is not material to the practice of the process.

The property of hygrometric material is well known, of absorbing moisture from the air and other gases, but where such material in a stationary form is exposed continuously to gas containing moisture the material is saturated with moisture and ceases to act as a purifier of the gas.

The present invention provides means for continuously discharging the moisture absorbed by the hygrometric material, thus maintaining the efficiency of such material near its initial point, and enabling the process and apparatus to be operated continuously.

The means for separating the moisture continuously from the material is shown herein as a hollow carrier having passages extended through its walls and said passages filled or packed with hygrometric material, as lime, and the carrier revolved rapidly while the gas to be purified is supplied to the interior of the carrier in contact with the hygrometric material. Such a structure may be called an absorbent cylinder.

The propulsion of the air is readily effected by mounting the hollow carrier upon a hub or drum by means of blades which serve to rotate the air with the carrier, and develop a high degree of centrifugal force.

Under the influence of such force the moisture in the gas is driven against the inside of the carrier and is absorbed by the material against which it is forced.

The rotation of the carrier enables the centrifugal force to produce a secondary effect, in discharging the absorbed moisture from the hygrometric material upon the outer side of the carrier, a casing being sustained about the carrier to intercept the moisture which is thus discharged, and to collect and deliver the same separately from the purified gas.

Figure 2:
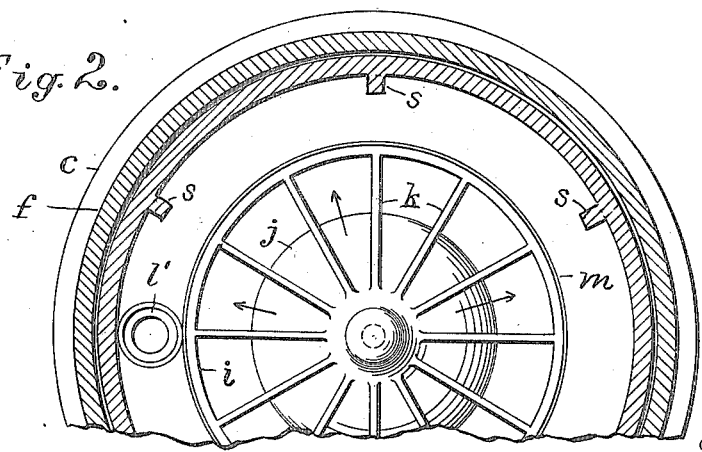

In the drawing, Figure 1 is a vertical section at the center of an apparatus for rotating the carrier and supplying the air thereto; Fig. 2 is a horizontal section of the casing and the rotary carrier on line 2—2 in Fig. 1, the nearer side being broken away for want of room upon the sheet; Fig. 3 is a section of portion of the rim of the carrier shown in Fig. 1, but upon a larger scale to exhibit the disposition of the hygrometric material; Fig. 4 is a plan of the carrier also upon a larger scale with the shell of the carrier broken away where hatched; Fig. 5 is a side elevation of the carrier; and Fig. 6 is a view like Fig. 3 with an alternative form for the passages.

The apparatus is shown with a base *a* sustaining a motor *b* with its spindle vertical.

A bed-plate *c* is sustained above the base to support an annular casing *d* within which the carrier C is rotated by the coupling of its shaft *b'* to the spindle of the motor.

An annular trough *f* is supported upon the bed-plate *c* around an opening *g* in the bed-plate, which opening leads the purified air outward between the base *a* and bed-plate *c* to a vent-pipe *h*.

A removable cover *p* is shown fitted over the motor, and its top extended up to the level of the drum *j* thus wholly protecting the motor from any liquid or other substance discharged from the carrier when the apparatus is arrested after a period of operation.

The shell *i* of the carrier is perforated to receive a charge of hygrometric material, and is connected to the drum $j$ upon the shaft $b'$ by means of radial blades $k$, so that in the construction shown the carrier is combined with a rotary fan to generate centrifugal force within the carrier.

The air-inlet $d'$ is formed in the top of the casing, leading the air into the rotary carrier C, the air being immediately grasped by the fan-blades $k$ and rotated rapidly with the carrier.

The carrier rotates above the inner margin of the trough $f$, and any liquid discharged from the carrier is arrested by the casing $d$ and falls into the trough from which it is discharged by pipe $l$. The air passes gradually between the drum $j$ and the casing $i$ into the opening $g$ in the bed-plate $c$, and from such space it escapes to the outlet $h$.

To expose the gas to a large area of the hygrometric material the passages through the carrier are formed as annular slots $e$ cut through the shell $i$, in which slots the hygrometric material is held while the carrier is rotated.

The aggregate of the fillings or packings of the material forms a very considerable mass, to which the gas is thoroughly exposed in its passage through the apparatus.

When the slots and spaces between them are equal, as shown in Fig. 6, the material fills one-half of the area within the carrier, and presents a very extended absorbent surface to the gas.

The carrier is loaded with the desired fillings or deposits of hygrometric material by charging the gas supplied to the apparatus with such material while the carrier is rotating, and simultaneously supplying a spray of water or other suitable fluid, which forms agglomerates of the hygrometric material in the passages through the shell, into which passages the material is thrown by the centrifugal force.

The material is located in passages extending through the shell of the carrier, so that the moisture absorbed by the material upon the inner side of the shell may, under the influence of centrifugal force, be discharged from the material upon the outer side of the shell, thus constantly renewing the capacity of the material to absorb moisture, which would very soon be lost if the absorbed moisture were retained in the material.

The carrier charged with the absorbent material may be properly termed an "absorbent cylinder".

The slots $e$ are shown in Fig. 6 cut through the shell of the carrier at right-angles to its axis and filled with the hygrometric material $o$. With such slots, a pervious fabric, as wire gauze $m$, is secured around the outer side of the shell, as shown at Fig. 6, which arrests the hygrometric material when deposited in the slots by centrifugal force, and prevents the dislodgment of the material from the passages when rotated.

In Figs. 1 and 3 the slots are shown at an acute angle to the surface of the shell with the object of retaining the filling $o$ in the slots by their undercut shape.

To assist still further in retaining the material in the slots, notches $e'$ may be cut in the blades $k$ beneath the slots $e$. The material $o$ then engages the edges of the notches, by its irregular disposition therein, as shown in Fig. 3, and locks the deposits to the carrier.

With the above construction it is found that a very great percentage of the moisture contained in any gas is absorbed by the hygrometric material, and such moisture is by the centrifugal force driven through the passages in the shell of the carrier and discharged from the outer side of such shell against the casing $d$.

The casing is fitted removably in the trough, making a water-seal with the water, which is permitted to accumulate therein to the level of the outlet-nozzle *l′*.

The water-seal prevents any outward current of air through the casing. Ribs *s* inside the casing arrest the motion of the fluid that is discharged into the casing from the carrier.

The arrows *o′* in Fig. 1 show the movement of the gas through the carrier from end to end, in its passage to the outlet *h*.

It will be observed that the centrifugal force acts directly and positively to drive the moisture in the air against the hygrometric material where it is exposed upon the inner side of the carrier, but such centrifugal force is not able to drive the air through the carrier into the casing. The air between the adjacent fan-blades may thus be carried around the carrier a good many times before it passes gradually from the carrier to the air-outlet *h*.

This mode of operation retains the air for an appreciable time in contact with the hygrometric material, so as to efficiently separate the moisture therefrom.

The electric motor *b* illustrates merely one means for rotating the carrier, as a belt and pulley would serve the same purpose.

Having thus set forth the nature of the invention what is claimed herein is:

1. In a gas purifier, a hollow carrier having hygrometric material fixed upon its wall, means for introducing the gas within the carrier, and means for rotating the carrier with the material to propel the gas against the said material by centrifugal force.

2. In a gas purifier, a hollow carrier with passages extended through its wall and charged with hygrometric material, means for rotating the carrier with said material, and means for propelling the gas against the said hygrometric material, and thus removing moisture from the gas.

3. In a gas purifier, a hollow carrier, a drum with blades sustaining the carrier thereon, passages through the wall of the carrier charged with hygrometric material, and an inlet leading gas to the blades whereby the gas is forced against the hygrometric material.

4. In a gas purifier, the combination, with a hollow carrier, of a drum with fan-blades sustaining the carrier thereon, passages through the wall of the carrier charged with hygrometric material, a casing surrounding the carrier and extended below the level of the same and provided with a trough for the extracted moisture, and an outlet delivering the liquid therefrom.

5. In a gas purifier, the combination, with a hollow carrier, of a drum and blades sustaining the carrier thereon, passages through the wall of the carrier charged with hygrometric material, an annular trough below the outer edge of the carrier receiving the liquid discharged therefrom, and a casing surrounding the carrier and extended into the liquid in the trough to form a seal therewith.

6. In a gas purifier, a carrier for a hygrometric material consisting of a cylindrical shell and a drum and blades for rotating the same, with cavities formed by passages extended through the shell and hygrometric material packed in the said cavities.

7. In a gas purifier, a carrier for a hygrometric material consisting of a cylindrical shell and a drum and blades for rotating the same, with cavities formed by passages extended through the shell, hygrometric material packed in the said cavities, and a pervious fabric encircling the said shell to retain the material in the cavities.

8. In a gas purifier, a carrier for a hygrometric material consisting of a cylindrical shell and a drum and fan-blades for rotating the same, with cavities formed of annular slots extended through the shell, and hygrometric material packed in the said slots.

9. In a gas purifier, a carrier for a hygrometric material consisting of a cylindrical shell and a hub and blades for supporting and rotating the shell, with cavities formed of annular slots extended through the shell and into the outer ends of the blades, hygrometric material packed in the said slots, and a pervious fabric encircling the said shell to retain the material in the cavities.

10. The process of separating moisture from a gas by forcing the gas through an absorbent cylinder from end to end, and forcing the absorbed moisture through the walls of the cylinder.

11. The process of separating a vapor from a gas by forcing the gas from end to end through an absorbent revolving cylinder having perforate walls, and forcing the absorbed moisture through the walls of the revolving cylinder by centrifugal force.

12. The process of separating a condensible vapor from a gas by forcing the gas from end to end through an absorbent cylinder having perforate walls, and throwing the condensed vapor through the walls of the absorbent cylinder by centrifugal force.

In testimony whereof I have hereunto set my hand.

WILLIAM J. BALDWIN.